United States Patent [19]

Araki et al.

[11] 4,406,250

[45] * Sep. 27, 1983

[54] APPARATUS FOR CONTROLLING ELECTROLESS PLATING BATH

[75] Inventors: Ken Araki, Ibaragi; Hiromitsu Sakai, Kawanishi; Yutaka Sugiura, Kobe, all of Japan

[73] Assignee: C. Uyemura & Co., Ltd., Osaka, Japan

[*] Notice: The portion of the term of this patent subsequent to Sep. 27, 2000 has been disclaimed.

[21] Appl. No.: 363,115

[22] Filed: Mar. 29, 1982

Related U.S. Application Data

[62] Division of Ser. No. 204,084, Nov. 4, 1980, Pat. No. 4,350,717.

[30] Foreign Application Priority Data

Dec. 29, 1979 [JP] Japan ................ 54-172961

[51] Int. Cl.³ .............................. C23C 3/02
[52] U.S. Cl. .................................... 118/690
[58] Field of Search ............ 427/8, 9, 10, 443.1, 427/345; 118/690, 429

[56] References Cited

U.S. PATENT DOCUMENTS 4,096,301 6/1978 Slominiski .................. 118/690
4,152,164 5/1979 Gully ........................... 427/345

Primary Examiner—Sam Silverberg
Attorney, Agent, or Firm—Birch, Stewart, Kolasch & Birch

[57] ABSTRACT

A method and an apparatus for controlling an electroless plating bath such as an electroless nickel plating bath capable of using the bath for an extended period of time without remake are disclosed. The method comprises the steps of continuously or intermittently measuring the concentration of at least one consumable ingredient in the electroless plating bath, and automatically adding to the plating bath a first replenishing composition essentially consisting of consumable ingredients after detecting that the measured value has reached a predetermined concentration; while continuously or intermittently measuring the consumed amount of at least one consumable ingredient of the electroless plating bath to determine the degree of aging of the bath, and automatically discharging the predetermined volume of the plating solution and automatically adding to the plating bath a second replenishing composition containing nonconsumable ingredients in an amount essentially corresponding to a lost amount by the discharging after detecting that the consumed amount of the consumable ingredients has reached a predetermined value.

10 Claims, 4 Drawing Figures

APPARATUS FOR CONTROLLING ELECTROLESS PLATING BATH

This application is a divisional of copending application Ser. No. 204,084, filed on Nov. 4, 1980 U.S. Pat. No. 4,350,717.

BACKGROUND OF THE INVENTION

This invention relates to a method for controlling electroless plating baths such as electroless nickel plating baths and an apparatus used therefor, and more particularly, to a method and apparatus for controlling electroless plating baths so that stable plating can be continuously conducted for an extended period of time.

Electroless plating baths are susceptible to severe variation of their composition since a metal salt, a reducing agent and other ingredients are quickly consumed during plating. It is thus necessary to frequently complement such consumed ingredients to create a constant rate of deposition and uniform thickness and properties of deposits. For such purposes, a variety of methods and apparatus for the automatic control or replenishment of electroless plating baths have been proposed as disclosed in Japanese Patent Application Laid-Open Nos. 53-44434, 53-45631 and 54-8123.

However, electroless plating baths such as electroless nickel plating baths and electroless copper plating baths have a short effective life. As electroless plating is continued for an extended period of time, reaction by-products accumulate in the plating solution. The reaction by-products, which are believed to be decomposition products of a reducing agent and neutralization salts resulting from plating reaction, adversely affect such factors as plating rate and properties of deposits. With the accumulation of reaction by-products the replenishment of the ingredients consumed by plating cannot prevent reduction of the plating rate and variation of the composition and properties of the deposits. Accordingly, although an electroless plating solution is replenished either by the above-mentioned automatic or by manual replenishing methods, plating baths age or become unusable within a relatively short period of time. The rate of deposition is remarkably reduced and the properties of the resulting deposits vary considerably as compared with those of the initial plating solution, even when the metal ion and the reducing agent are replenished so as to increase their concentrations to the levels in the initial plating solution. Under such circumstances, the aged bath must be discarded and replaced by a fresh plating solution.

Even in the case where the above-mentioned automatic control of an electroless plating bath is employed to automatically replenish a plating solution, the degree of aging of the bath should always be separately monitored to accommodate such aging. Accordingly, plating baths must be discarded after a relatively short period of use in the prior art electroless plating processes combined with the above-mentioned automatic control method. The prior plating processes are also unsatisfactory with respect to bath maintenance.

SUMMARY OF THE INVENTION

It is therefore an object of the present invention to provide a method and an apparatus for controlling an electroless plating bath whereby stable continuous electroless plating can be carried out for an extended period of time with substantial elimination of the need for remaking the new electroless bath or at least with substantial retardation of plating bath remaking as compared with the prior art method and hence, with substantial advantages in waste disposal.

Another object of the present invention is to provide a method and an apparatus for controlling an electroless plating bath whereby the rate of deposition and the properties of deposits can be kept substantially constant and uniform for an extended period of time, and bath maintenance is easy and accurate.

A further object of the present invention is to provide an electroless plating control method and apparatus suitable in the practice of electroless plating of nickel, cobalt, nickel-cobalt alloy, copper, tin, gold, silver and the like.

According to one aspect of the present invention, there is provided a method for controlling an electroless plating bath capable of using the bath for an extended period of time without remake, the method comprising the steps of:

continuously or intermittently measuring the concentration of at least one consumable ingredient in the electroless plating bath, and automatically adding to the plating bath a first replenishing composition essentially consisting of consumable ingredients after detecting that the measured value has reached a predetermined concentration; while continuously or intermittently measuring the consumed amount of at least one consumable ingredient of the electroless plating bath to determine the degree of aging of the bath, and automatically discharging a predetermined volume of the plating solution and automatically adding to the plating bath a second replenishing composition containing unconsumable ingredients in an amount essentially corresponding to an amount lost by the discharging after detecting that the consumed amount of the consumable ingredient has reached a predetermined value.

According to another aspect of the present invention, there is provided an apparatus for controlling an electroless plating bath capable of using the bath for an extended period of time without remake, the apparatus comprising:

a mechanism for supplementing a first replenishing composition including:

means for automatically measuring the concentration of at least one consumable ingredient in the electroless plating bath, concentration detecting means for generating a first signal when the measured value has reached a predetermined concentration, and means for automatically adding the first replenishing composition essentially consisting of consumable ingredients to the electroless plating bath upon receipt of the first signal, and a mechanism for discharging a predetermined volume of the electroless plating solution and supplementing a second replenishing composition including means for measuring the consumed amount of at least one consumable ingredient of the electroless plating bath to determine the degree of aging of the bath, aging degree detecting means for generating a second signal when the consumed amount of the consumable ingredient has reached a predetermined value, means for discharging a predetermined volume of the plating solution upon receipt of the second signal, and means for adding to the electroless plating bath the second replenishing composition containing unconsumable ingredients in an amount essentially corresponding to a lost amount by the discharging.

In the present invention, "consumable ingredients" designate ingredients consumed during electroless plating, e.g. a metal ion such as nickel ion and a reducing agent such as sodium hypophosphite for nickel electroless plating bath, and "unconsumable ingredients" designate ingredients not essentially consumed during electroless plating except by drug-out, e.g. a chelating agent such as sodium acetate, sodium citrate, etc.

In preferred embodiments of the present invention, the concentration of the electroless plating bath is measured in terms of the concentration of a metal in the bath, while the degree of aging of the electroless plating bath is obtained by measuring the consumed amount of a metal in the bath. In this case, the amount of the metal ion consumed in the bath may be monitored by counting the number of replenishment of the first replenishing composition which in turn, is obtained by counting the number of command signals for commanding the automatic replenishment of the first replenishing composition.

In the present invention the concentration of an electroless plating bath, for example, the metal concentration in the bath, is measured to determine the amount of the consumable ingredients consumed during plating and the first replenishing composition essentially consisting of the consumable ingredients is automatically replenished in accordance with the measured value; meanwhile, the consumed amount of a consumable ingredient (for example, a metal ion) in the bath is measured to determine the degree of aging of the bath and a predetermined volume of the plating solution is discharged and the second replenishing composition containing the unconsumable ingredients essentially corresponding to the discharged portion is automatically replenished each time the given consumable ingredient has been consumed in a predetermined amount (that is, each time the degree of aging has reached a predetermined value). The bath is thereby automatically refreshed, substantially eliminating the need for remaking a plating bath or at least substantially extending the effective life of the bath as compared with the prior art methods. Furthermore, since the consumable ingredients such as metal ions, reducing agents, etc. are maintained at substantially constant concentrations and the amount of reaction by-products resulting from plating process is maintained within an allowable range, the rate of deposition and the properties of the resulting deposits are maintained constant and uniform. Differently stated, the bath is maintained under highly stable conditions for an extended period of time. It is also possible to maintain the plating bath at a lower metal concentration than the prior art bath while retaining the rate of deposition at substantially the same level as the prior art. These features are also advantageous from a point of view of waste disposal.

The present invention may advantageously be applied to electroless plating baths of nickel, cobalt, nickel-cobalt alloy and copper.

BRIEF DESCRIPTION OF THE DRAWINGS

The above and other objects, features and advantages of the invention will become more apparent from the following description and claims taken in connection with the accompanying drawings, in which:

DETAILED DESCRIPTION OF THE PREFERRED EMBODIMENTS

Figure 1:
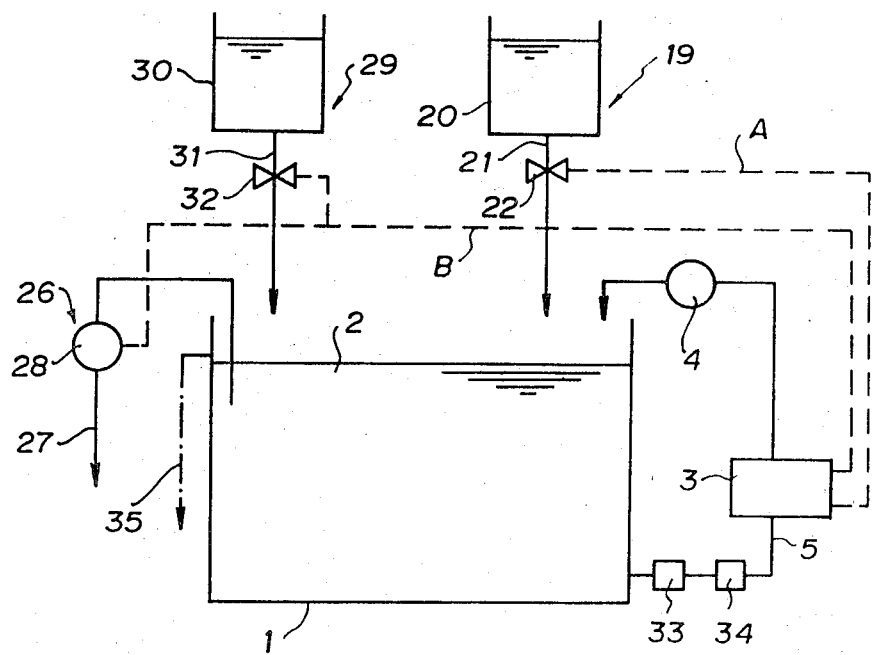
FIG. 1 is a block diagram schematically showing one embodiment of the electroless plating arrangement according to the present invention.

Referring to FIG. 1, one embodiment of the arrangement for controlling an electroless nickel plating bath according to the present invention is schematically shown as including a plating tank 1 which is provided with the necessary attachments including a heating element for heating an electroless plating bath 2 to a desired temperature, for example, a heater or steam pipe, a cooling element for cooling the bath 2 to a approximately room temperature after the completion of plating, a filter, a stirrer and the like, although they are not shown in the figure.

In connection with the plating tank 1, the arrangement includes a concentration measuring/detecting device 3 for automatically measuring the concentration of the plating bath and transmitting signal A when the measured value has reached a predetermined concentration level and signal B when the number of commands for signal A has reached a predetermined level, a fluid circulating pump 4 in the form of a microtube pump, for example, and a circulating line 5 communicating the tank 1, measuring/detecting device 3 and the pump 4. The plating solution 2 in the tank 1 is pumped from the inlet through the line 5 to the concentration measuring/detecting device 3 where the concentration of the plating solution 2, for example the nickel concentration, is measured before it is returned into the tank 1 from the outlet of the line 5.

Figure 2:
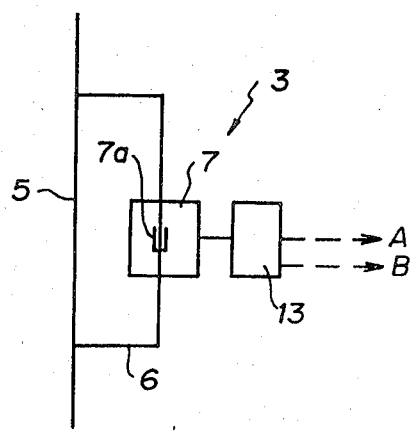
FIG. 2 is a block diagram of an example of the concentration measuring device.
Figure 3:
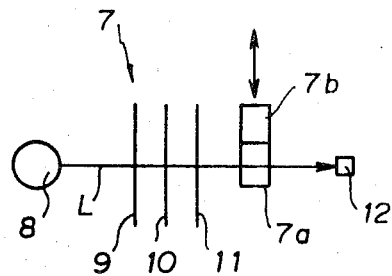
FIG. 3 is a block diagram of a spectrophotometer section of the concentration measuring device.
Figure 4:
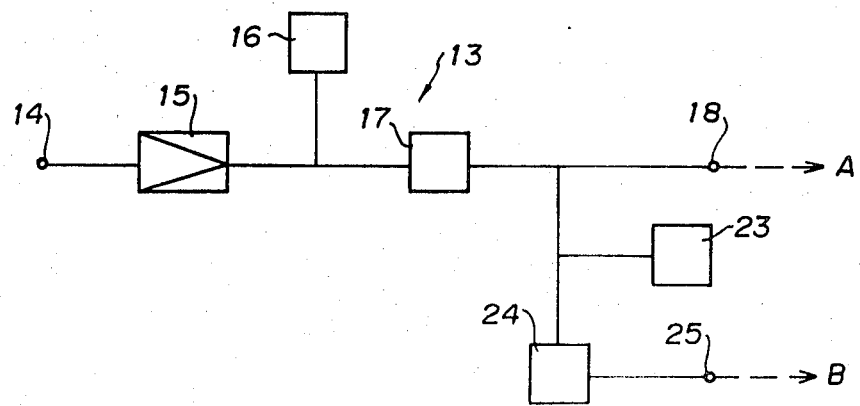
FIG. 4 is a block diagram of a control section of the concentration measuring device.

FIGS. 2 to 4 illustrate an example of the concentration measuring/detecting device 3. As shown in FIG. 2, the line 5 is provided with a bypass conduit 6 which in turn, is provided with a spectrophotometer unit 7 including a flow-through cell 7a. As the plating solution 2 flows through the bypass conduit 6 and then through the flow-through cell 7a of the spectrophotometer unit 7, the optical transmittance of the solution is measured to determine the metal concentration in the solution. In this respect, it is preferable to measure the absorbance of a metal complex in the plating solution in order to follow the consumption of the metal by plating in a more sensitive manner. The transmittance of the plating solution at the absorption wave length of the metal complex is transduced into a voltage signal by means of a suitable transducer. The concentration of the plating solution 2 is monitored in this manner.

The concentration measuring/detecting device 3 is described in detail by referring to FIGS. 3 and 4. As shown in FIG. 3, light L emitted by a light source 8 in the spectrophotometer unit 7 transmits a heat radiation-absorbing filter 9, a wave length-selecting filter 10 and a condensing lens 11 in this order before it transmits the cell 7a through which the plating solution flows continuously. The absorption of light by the plating solution is detected by a photometer 12. Another cell 7b containing the standard solution is mounted adjacent the cell 7a so that the cells may be alternately placed in the light path. The measurement cell 7a and the standard cell 7b are movable in the direction shown by an arrow. The standard cell 7b may be moved in the light path to replace the measurement cell 7a when needed, thereby measuring the absorbance of the standard solution. The spectrophotometer unit 7 is electrically connected to a control section 13. As shown in FIG. 4, a minute current flow output of the photometer 12 is fed to an input 14, amplified and converted into a voltage by an amplifier 15, and indicated by a volt-meter 16 in the form of a voltage corresponding to the absorbance. A comparator 17 compares the output of the amplifier 15 with a preset voltage and produces signal A at its output 18 when the amplifier output reaches the preset value. If the preset voltage value corresponds to the absorbance at a given concentration to which the metal ion in the plating solution is consumed, then signal A developing at the output 18 represents that the metal concentration has reached the given value. Signal A is transmitted to a first replenishing mechanism 19 which consists of a reservoir 20 containing a first replenishing composition, a supply conduit 21 connected to the reservoir 20 and opening in the plating tank 1, and an electromagnetic valve 22 in the conduit 21. Upon receipt of signal A, the valve 22 is opened for a given time to allow a given amount of the first replenishing composition to flow into the plating tank 1 through the conduit 21. Thus the given amount of the first replenishing composition essentially consisting of consumable ingredients, for example, a metal salt, a reducing agent, a pH regulating agent and other consumable components is added to the electroless plating bath corresponding to the consumption. It should be noted that although the single reservoir 20 is depicted in FIG. 1, a plurality of reservoirs may be used. Each reservoir contains a different consumable ingredient (e.g., a metal salt, a reducing agent, a pH regulating agent or other components). Of course, each reservoir is provided with its own conduit and electromagnetic valve.

By analyzing the metal value, e.g. nickel value in an electroless nickel plating bath, in this manner, not only the amount of the metal consumed during plating is available, but also the amount of the reducing agent consumed and the variation of pH value are available at the same time.

As shown in FIG. 4, a counter 23 is connected to the control section 13. The counter 23 counts the number of commands for signal A for instructing opening of the electromagnetic valve 22 of the first replenishing mechanism 19. The number of actuations of the electromagnetic valve 22 equals the number of replenishments with the first replenishing composition. A detector 24 is also provided which detects that the number of command of signals A (that is, the number of replenishment of the first replenishing composition) reaches a predetermined number. At this point, the detector 24 transmits signal B from its output 25.

Referring to FIG. 1 again, numeral 26 is a discharge mechanism actuatable upon receipt of the abovementioned signal B. This discharge mechanism 26 comprises a discharge pipe 27 having one end in fluid communication with the plating tank 1 and a control pump 28 disposed in the pipe. Upon receipt of signal B from the output 25 of the detector 24, the pump 28 operates for a given time to discharge a given volume of the plating solution 2 out of the tank 1. Numeral 29 is a mechanism for supplementing the second replenishing composition containing essential ingredients which are to be lost by the discharging. The replenishing mechanism 29 comprises a reservoir 30 containing the second replenishing composition, a feed pipe 31 having one end connected to the reservoir 30, and an electromagnetic valve 32 disposed in the pipe 31. The electromagnetic valve 32, which receives signal B from the output 25 of the detector 24, opens for a given time after the discharge pump 28 has been interrupted, to thereby add the second replenishing composition containing nonconsumable ingredients in a volume essentially corresponding to the discharged volume into the tank 1. In this regard, the replenishing mechanism 29 may include a plurality of reservoirs each for different one of the ingredients to be replenished, each having an individual feed pipe and valve.

In FIG. 1, a cooler 33 is provided in the measuring line 5 to cool the flow of the plating solution therethrough from the tank 1 to near room temperature. Also provided in the line 5 is a filter 34 for filtering out very fine insolubles out of the flow of the plating solution therethrough. The location of the cooler 33 in the line 5 upstream of the concentration measuring/detecting device 3 allows for measurement of concentration at room temperature because a flow of the plating solution through the bypass conduit 6 has been cooled to room temperature. For the purpose of avoiding temperature dependence of these measurements, any other means may be employed as exemplified by the use of a constant-temperature bath or a temperature probe accompanied with electrical compensation.

Described below is how to control an electroless nickel plating bath using the above-constructed arrangement.

A workpiece to be plated is first subjected to well-known necessary pre-treatments in a conventional manner before electroless nickel plating is carried out by immersing the pre-treated workpiece in the plating bath 2 in the tank 1 heated at a desired temperature, for example, 90° C.

In the practice of plating in this manner, the pump 4 is operated to introduce part of the plating solution 2 from the tank 1 into the measuring line 5. As the plating solution continuously passes through the concentration measuring/detecting device 3 where the concentration (nickel concentration in the case of the concentration measuring/detecting device 3 shown in FIG. 2) of the solution is automatically measured.

The progress of plating results in a reduction of the concentration of the plating solution, particularly the concentrations of nickel ion and a reducing agent (such as sodium hypophosphite) in the solution. In the event a hypophosphite is used as a reducing agent for electroless nickel plating, the plating solution also shows a reduction of pH. As a result of such concentration reduction, when the nickel concentration measured by the spectrophotometer unit 7 reaches a predetermined concentration value in the case of the concentration measuring/detecting device 3 shown in FIG. 2, the control section 13 associated with the detecting device 3 produces signal A. In detail, prior to measurement of the absorbance of the actual plating solution, the standard solution cell 7b is moved in the light path to replace the cell 7a. The absorbance of nickel in the standard solution in the cell 7b is measured and the thus obtained absorbance value is set in the comparator 17 as a reference value. Then the flow-through cell 7a is moved in the light path. When the concentration (nickel concentration) of the solution which is given in terms of the absorbance of the plating solution measured by the spectrophotometer unit 7 reaches the predetermined concentration value or when the voltage detected reduces to or below the preset reference value, the comparator 17 transmits signal A to the electromagnetic valve 22 of the first replenishing mechanism 19 to open the valve 22 for a given time. Accordingly, a given amount of the first replenishing composition is fed from the reservoir 20 to the tank 1 to compensate for those ingredients consumed during the preceding plating such as nickel ion and reducing agent and to adjust the pH of the plating bath 2. It should be noted that the first replenishing composition mainly contains those ingredients consumable during plating including nickel salt, reducing agent and pH regulating agent such as sodium hydroxide and optionally, a minor amount of complexing agent, stabilizer, brightener, etc. It is generally desired to keep the nickel salt, reducing agent and pH regulating agent separate from each other. In such separate storage, each optional agent such as complexing agent, stabilizer, and brightener may preferably be mixed with the basic ingredient to which it is inert.

By adding the first replenishing composition in this manner, the concentration of the plating bath 2 (the concentrations of nickel, reducing agent, etc.) is restored to the initial level so that the rate of plating or deposition is maintained substantially constant.

On the other hand, the counter 23 counts the number of commands for signal A to the valve 22 of the first replenishing mechanism 19, that is the number of actuation of the valve 22, and hence the number of replenishment of the first replenishing composition. When the detector 24 detect that the counted number reaches a predetermined number, for example, each time when one or several signals A are generated, the detector 24 transmits signal B from its output 25 to the pump 28 of the discharge mechanism 26 to operate the pump 28 for a given time, thereby discharging a given volume of the plating solution 2 from the tank 1 through the discharge pipe 27. It should be noted that the discharge liquid is desirably fed to a waste treatment device and essential ingredients contained therein may be circulated for reuse after the undesired by-products are removed. Upon interruption of the pump 28, the electromagnetic valve 31 of the second replenishing mechanism 29 is opened for a given time to supply a given volume of the second replenishing composition from the reservoir 30 to the tank 1. It should be noted that this second replenishing composition makes up for those ingredients to be lost by discharging and mainly contains a complexing agent. Generally, use may be made of a solution having the same composition as the initially made-up plating bath or its concentrate or those solutions mainly containing a complexing agent which is scarcely consumed by plating. If ingredients to be replenished, such as metal salt and reducing agent tend to react with each other, it is preferred that they are separately stored in different reservoirs.

The discharging of a given volume of the plating solution and the replenishing of an essentially corresponding volume of the second replenishing composition prevent reaction by-products from accumulating in the plating bath to an undesired extent, thereby controlling the amount of such reaction by-products within an allowable range. As a result, reduction of the plating rate due to accumulation of reaction by-products is precluded. The plating bath is intermittently renewed in the continued operation for an extended period of time. For an extended operation of the plating bath, the plating rate is maintained substantially constant and deposits are maintained substantially uniform in every respect including the composition and properties, for example, a Ni-P alloy composition for a hypophosphite reducing agent and the hardness of deposits.

As described above, reaction by-products accumulate in a plating bath as plating is continued for a period of time. The accumulated reaction by-products adversely affect the plating rate and the quality of deposits. These reaction by-products mainly consist of the products of a reducing agent decomposed when the metal ion in the plating bath is reduced into an elemental metal by the reducing agent and neutralization salts resulting from this reaction. In this respect, the amount of a reducing agent required to reduce a certain amount of metal ion into an elemental metal is substantially constant and the amount of reaction by-products resulting from this reduction is also substantially constant. The consumption of a given amount of metal ion or reducing agent results in the formation of a corresponding amount of reaction by-products. Therefore, the consumed amount of a consumable ingredient in such a plating bath represents the degree of accumulation of reaction by-products in the bath. Accordingly, by detecting the consumed amount of at least one consumable ingredient in the bath (for example, the consumed amount of metal ion or reducing agent, more specifically, the consumed amount of nickel ion, or hypophosphite in the case of electroless nickel plating bath using a hypophosphite reducing agent, or in some cases the consumed amount of caustic alkali), the degree of accumulation of reaction by-products, that is, the degree of aging of the plating bath can be accurately detected. In this embodiment, the detection of the number of actuation of the valve 22 is equivalent to the detection of the number of replenishment of the first replenishing composition which in turn, is equivalent to the detection of the consumed amount of the consumable ingredients during plating. Each time the number of actuation of the valve 22 reaches a predetermined value, a given volume of the plating solution 2 is discharged and an essentially corresponding volume of the second replenishing composition (mainly containing ingredients to be lost by the discharging) is replenished, thereby maintaining the amount of reaction by-products within an allowable range in the plating bath. As a result, the plating solution is semi-permanently effective or at least the effective life of the plating solution is remarkably extended as compared with the prior art methods. In addition, the plating rate and the properties of deposits are maintained substantially uniform for the prolonged operation of the bath.

According to the above-mentioned plating process, the plating bath is automatically controlled and maintained in an easy, but accurate manner. Especially important is the ease of maintenance of electroless plating baths which are notoriously troublesome to handle as compared with usual electroplating. Furthermore, since the plating bath is always maintained at a substantially constant concentration by the replenishment, the nickel concentration of the bath may be set lower at the beginning unlike the prior art which needs to set the initial nickel concentration to a higher level in order to compensate for the reduction of plating or deposition rate due to reduction of nickel concentration in the progress of plating. In addition, the plating bath of the present invention is automatically renewed little by little by means of the discharging and replenishing mechanisms.

26 and 29, thereby minimizing the burden of waste treatment.

In the above embodiment, the absorbance of a plating solution is directly measured in order to determine metal concentration such as nickel in the plating solution. However, the method for measuring metal concentration in the plating solution is not limited thereto, but any other suitable means may be used. For example, an indicator or other suitable reagents such as EDTA may be added to the plating solution to cause the plating solution to develop the corresponding color. The degree of color development is a measure for the metal concentration. In this case, however, those portions of the plating solution which have been subjected to concentration measurement cannot be fed back to the line 5 via the bypass conduit 6 as in the case of FIG. 2. The plating solution after measurement should be separately fed to a suitable unit for waste disposal. Another example of concentration measurement is to measure the potential difference between the initial and the subsequent portions of the solution. However, the above-described method of directly measuring the absorbance of the plating solution is most advantageous among others because it can be performed by means of simple equipment and the plating solution subjected to measurement can be fed back to the plating tank 1 again. Furthermore, it is also possible to detect the varying concentration of a plating solution by measuring the varying pH value thereof. Additionally, the abovementioned nickel concentration measurement may be combined with the pH measurement so that the pH of the plating solution may be automatically and independently controlled in accordance with the value of pH measured.

The detection of the consumed amount of the consumable ingredients is carried out by the method of detecting the number of actuations of the valve 22 by counting the number of commands for signal A in the above embodiment. If a dispensing pump is used to replenish a metered amount of the first replenishing composition, the consumed amount of the consumable ingredient may be detected by counting the number of actuation of the dispensing pump. Any other suitable detecting methods may be employed for a particular way of replenishing. Furthermore, the consumed amount of the consumable ingredient may also be detected by measuring the amount of a metal deposited. If workpieces to be plated have a substantially equal surface area and the necessary plating time or necessary deposition thickness is equal for each plating cycle, then an equal amount of metal is reduced and deposited and an equal amount of metal ion is consumed in each plating cycle. Then the detection method may be to count the number of signals generated by a limit switch each time a plated workpiece is replaced by a new unplated workpiece in the plating bath. If workpieces to be plated have a substantially equal surface area, but the necessary plating time is not always equal, then the amount of metal deposited may be detected by measuring the plating time and the consumed amount of the consumable ingredients may be derived therefrom. After a certain total plating time, the above-mentioned discharging and replenishing steps may be carried out.

In the above-mentioned embodiments, the concentration measuring device is incorporated in the bypass conduit, but it may be directly incorporated in the circulating line with omission of the bypass conduit. Also, the concentration measuring device may be provided within the plating tank.

In the above-mentioned embodiments, the second replenishing mechanism 29 acts after the discharge pump 28 of the discharge mechanism 26 has been interrupted. Alternatively, the replenishing mechanism 29 may act by the command of signal B when or before the discharge pump 28 operates. The first and second replenishing mechanisms 19 and 29 are not limited to the above-mentioned embodiments. For example, a dispensing pump may be used for the supplement of the first or second replenishing composition.

The discharge mechanism 26 may be replaced by an overflow pipe 35 as depicted by a dot-and-dash line in FIG. 1. In this case, signal B is transmitted from the control section 13 to the second replenishing mechanism 29 to feed a given volume of the second replenishing composition to the plating bath in the tank 1. An incremental volume of the plating solution due to the addition of the second replenishing composition is discharged through the overflow pipe 35. Although the above-mentioned embodiments refer to the control of electroless nickel plating, similar results may be obtained for other electroless plating including electroless cobalt plating and electroless cobalt-nickel plating as well as electroless copper plating using a formalin or hypophosphite reducing agent.

Other modifications and variations may be made within the scope and spirit of the invention.

The invention will be understood more readily with reference to the following examples, which are not to be construed to limit the scope of the invention.

EXAMPLE 1

Plating was conducted in 100 liters of an electroless nickel plating bath having the following composition:

| | |
|---|---|
| Nickel sulfate (NiSO$_4$.6H$_2$O) | 18 g/l |
| (nickel ion | 4 g/l) |
| Sodium hypophosphite (NaH$_2$PO$_2$.H$_2$O) | 24 g/l |
| Sodium succinate | 16 g/l |
| Malic acid | 18 g/l |
| Stabilizer (Pb$^{2+}$) | 0.003 g/l |
| pH | 5.6 | at a temperature of 90° C. in an apparatus as shown in FIGS. 1 to 4 while the nickel concentration was automatically and continuously measured (the nickel concentration measurement was effected by measuring the transmittance at 670 nm). It was assumed that the set level of nickel ion was 4 g/l. At the time the nickel concentration measured had decreased to the set level (4 g/l) or below, signal A was generated to add a first replenishing composition consisting of the belowmentioned three replenishing solutions I, II and III in equal amounts of 400 ml (equivalent to 0.2 g/l of Ni$^{2+}$) for each addition. These replenishing solution I, II and III were contained in three separate reservoirs each provided with a feed conduit and an electromagnetic valve. In response to signal A, the valves were simultaneously opened for a given time to feed equal amounts of the respective replenishing solutions to the plating bath. It was also assumed that when 1 g/l of nickel ion was consumed or a total amount of the replenishing solution I adding up to 1 g/l of nickel ion was replenished, signal B was generated to discharge 5 liters of the plating bath each time before 5 liters of a second replenishing composition consisting of the solution IV having the following composition was fed. (the invention method)

For the purpose of comparison, the above-mentioned plating procedure was repeated except that signal B was not generated, and hence, neither the discharge of the plating solution nor the replenishment of the second replenishing solution IV was conducted. That is, only the nickel concentration was measured and the solutions I, II and III were added accordingly. (comparative method)

After plating was conducted a given number of turns (by "one turn" is meant the consumption of 4 g of nickel ion per liter of plating bath in continuous plating, and hence an increased number of turns results in further aging of the bath), the rate of deposition and the composition of Ni-P alloy deposit were determined, obtaining the results shown in Table 1.

| The first replenishing composition: | |
|---|---|
| Replenishing solution I | |
| Nickel sulfate | 225 g/l |
| Stabilizer ($Pb^{2+}$) | 0.075 g/l |
| Replenishing solution II | 270 g/l |
| Sodium hypophosphite | |
| Replenishing solution III | 68 g/l |
| Sodium hydroxide | |

| The second replenishing solution (composition) IV: the same composition as the initial plating solution | |
|---|---|
| Sodium succinate | 16 g/l |
| Malic acid | 18 g/l |
| Nickel sulfate | 18 g/l |
| Sodium hypophosphite | 24 g/l |
| Stabilizer ($Pb^{2+}$) | 0.003 g/l |

TABLE 1

| Number of turns | Rate of deposition (μm/hour) | | P content in N—P deposit (% by weight) | |
|---|---|---|---|---|
| | Invention | Comparative | Invention | Comparative |
| 2 | 20.5 | 20.0 | 7.8 | 7.8 |
| 4 | 20.0 | 17.0 | 8.0 | 8.4 |
| 6 | 19.8 | 13.5 | 8.1 | 9.2 |
| 8 | 19.7 | 10.0 | 8.2 | 9.8 |
| 10 | 19.5 | 8.5 | 8.3 | 10.4 |
| 12 | 19.3 | unplated | 8.3 | — |
| 14 | 19.1 | | 8.4 | |
| 16 | 19.0 | | 8.5 | |
| 18 | 18.9 | | 8.6 | |
| 20 | 18.8 | | 8.5 | |
| 22 | 18.6 | | 8.7 | |
| 24 | 18.4 | | 8.7 | |
| 26 | 18.5 | | 8.8 | |
| 28 | 18.3 | | 9.0 | |
| 30 | 18.0 | | 8.9 | |
| 32 | 17.9 | | 9.1 | |
| 34 | 17.7 | | 9.3 | |
| 36 | 17.4 | | 9.3 | |
| 38 | 17.2 | | 9.5 | |
| 40 | 16.7 | | 9.6 | |

EXAMPLE 2

Plating was conducted in an electroless cobalt plating bath having the following composition:

| Cobalt sulfate ($CoSO_4.7H_2O$) | 22.5 g/l |
|---|---|
| Sodium hypophosphite ($NaH_2PO_2.H_2O$) | 22.5 g/l |
| Sodium tartrate | 115.0 g/l |
| Boric acid | 8.4 g/l |
| Thiourea | 0.01 g/l |

| -continued | |
|---|---|
| pH | 9.0 | at a temperature of 90° C. in an apparatus as shown in FIGS. 1 to 4 while the cobalt concentration of the bath was automatically and continuously measured. It was assumed that the set level of cobalt ion was 4 g/l. At the time the cobalt concentration measured had decreased to the set level (4 g/l) or below, signal A was generated to add a first replenishing composition consisting of the below-mentioned three replenishing solutions V, VI and VII in equal amounts of 2 ml per liter of the bath for each addition. These replenishing solutions V, VI and VII were contained in three separate reservoirs each provided with a feed conduit and an electromagnetic valve. In response to signal A, the valves were simultaneously opened for a given time to feed equal amounts of the respective solutions V, VI and VII to the plating bath. It was also assumed that when 1 g/l of cobalt ion was consumed or a total amount of the replenishing solution V adding up to 1 g/l of cobalt ion was replenished, signal B was transmitted to discharge 10–50 ml/l of the plating bath each time before the corresponding amount of a second replenishing composition consisting of the solution VIII having the following composition was fed. (the invention method)

For the purpose of comparison, the above-mentioned plating procedure was repeated except that signal B was not generated, and hence, neither discharge of the plating bath nor replenishment of the second replenishing solution VIII was conducted. That is, only the cobalt concentration was measured and the solutions V, VI and VII were added accordingly. (the comparative method)

After plating was conducted a given number of turns (by "one turn" is meant the consumption of 4 g of cobalt ion per liter of plating bath in continuous plating), the rate of deposition and the composition of Co-P alloy deposit were determined, obtaining the results shown in Table 2.

| The first replenishing composition | |
|---|---|
| Replenishing solution V | |
| Cobalt sulfate | 240 g/l |
| Thiourea | 0.11 g/l |
| Replenishing solution VI | 270 g/l |
| Sodium hypophosphite | |
| Replenishing solution VII | 68 g/l |
| Sodium hydroxide | |

| The second replenishing solution VIII | |
|---|---|
| Sodium tartrate | 115 g/l |
| Boric acid | 8.4 g/l |

TABLE 2

| Number of turns | Rate of deposition (μm/hour) | | P content in Co—P deposit (% by weight) | |
|---|---|---|---|---|
| | Invention | Comparative | Invention | Comparative |
| 1 | 14.7 | 14.5 | 4.4 | 4.3 |
| 2 | 14.4 | 14.0 | 4.4 | 4.4 |
| 3 | 13.8 | 13.3 | 4.6 | 4.8 |
| 4 | 13.3 | 12.8 | 4.8 | 5.2 |
| 5 | 13.0 | 11.1 | — | 5.7 |
| 6 | 12.7 | 9.1 | 5.2 | 5.8 |
| 7 | 12.3 | 6.3 | — | 6.4 |
| 8 | 12.0 | 3.6 | 5.5 | 7.1 |
| 9 | 11.6 | unplated | — | — |

TABLE 2-continued

| Number of turns | Rate of deposition (μm/hour) | | P content in Co—P deposit (% by weight) | |
|---|---|---|---|---|
| | Invention | Comparative | Invention | Comparative |
| 10 | 11.0 | | 5.7 | |
| 11 | 10.4 | | — | |
| 12 | 9.8 | | 6.0 | |
| 13 | 9.6 | | — | |
| 14 | 9.0 | | 6.2 | |
| 15 | 8.4 | | — | |
| 16 | 7.6 | | 6.4 | |

As seen from the results of Tables 1 and 2, the present invention is advantageous in that the effective life of an electroless plating bath is substantially extended as compared with prior art methods. Furthermore, the rate of deposition and the physical properties of deposits are substantially uniform and consistent, and plating baths can be maintained highly stable for an extended period of time since metallic value, reducing agent and other ingredients are maintained at substantially constant concentrations and the amount of reaction by-products resulting from plating process is maintained within an allowable range.

What is claimed is:

1. An apparatus for controlling an electroless plating bath capable of using the bath for an extended period of time without remake, the apparatus comprising:
   (a) a consumable ingredients supplementing mechanism for supplementing a first replenishing composition including:
      a concentration measuring means for automatically measuring a concentration value corresponding to the concentration of one consumable ingredient in the electroless plating bath,
      a concentration detecting means for generating a first signal when the measured concentration value has reached a predetermined concentration value, and
      a first replenishing means fior automatically adding the first replenishing composition consisting essentially of consumable ingredients to the electroless plating bath upon receipt of the first signal; and
   (b) a nonconsumable ingredients supplementing mechanism for discharging a predetermined volume of the electroless plating solution and supplementing a second replenishing composition including:
      a consumption measuring means for measuring a consumption value corresponding to the consumed amount of at least one consumable ingredient of the electroless plating bath to determine the degree of aging of the bath,
      an aging degree detecting means for generating a second signal when the consumption value has reached a predetermined consumption value;
      a discharge means for discharging a predetermined volume of the plating solution upon receipt of the second signal, and
      a second replenishing means for adding to the electroless plating bath the second replenishing composition containing nonconsumable ingredients in an amount essentially corresponding to the amount lost by the discharging.

2. The apparatus as set forth in claim 1 wherein the concentration measuring means determines the absorbance of a metal ion in the electroless plating bath.

3. The apparatus as set forth in claim 2 wherein the aging degree detecting means is a counting means for counting the number of replenishments of the first replenishing composition.

4. The apparatus as set forth in claim 3 wherein said counting means counts the number of first signals for commanding the automatic replenishment of the first replenishing composition.

5. The apparatus as set forth in claim 1, wherein said concentration measuring means is a spectrophotometer.

6. The apparatus as set forth in claim 1, wherein said concentration detecting means includes:
   voltage producing means for producing an output voltage in response to the output of said concentration measuring means; and
   a comparator means for comparing said output voltage with a preset voltage, said comparator means generating said first signal when said output voltage equals said preset voltage.

7. The apparatus as set forth in claim 1, wherein said first replenishing means includes a first reservoir containing said first replenishing composition and a first valve associated with said first reservoir, said first valve opening in response to said first signal thereby permitting said first replenishing composition to flow from said first reservoir to said bath.

8. The apparatus as set forth in claim 4, wherein said aging degree detecting means further includes a detector means for comparing the number of said first signals with a preset number, said detector means generating a second signal when the number of generated first signals equals said preset number.

9. The apparatus as set forth in claim 8, wherein said second replenishing means includes a second reservoir containing said second replenishing composition and a second valve associated with said second reservoir, said second valve opening in response to said second signal thereby permitting said second replenishing composition to flow from said second reservoir to said bath.

10. The apparatus as set forth in claim 1, wherein said concentration measuring means includes a sampling means for removing a sample from said bath and cooling said sample to room temperature prior to measuring said concentration value.

* * * * *